Feb. 20, 1968   V. L. DARBY ETAL   3,369,442
BLIND NUT ASSEMBLY JOINT
Original Filed Feb. 9, 1965
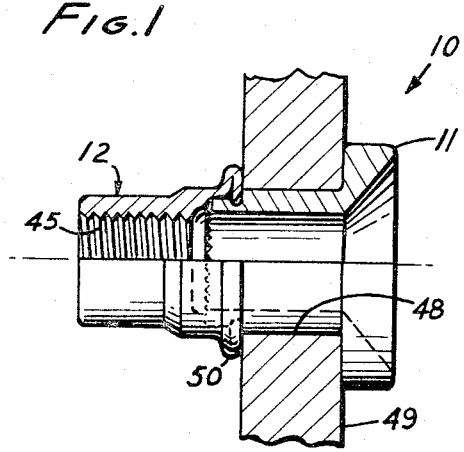
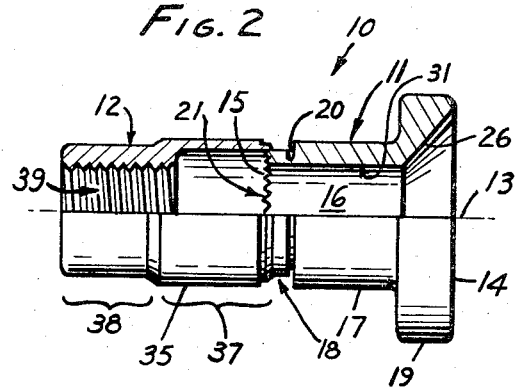
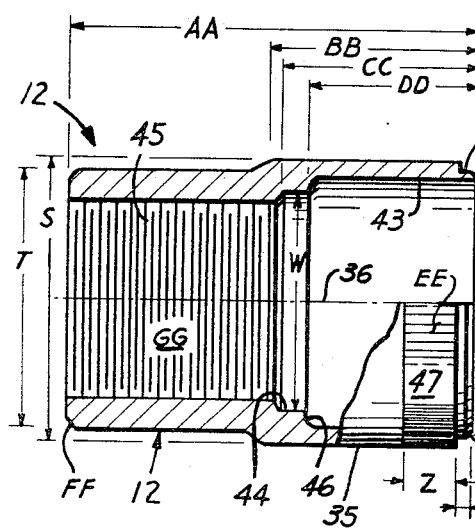
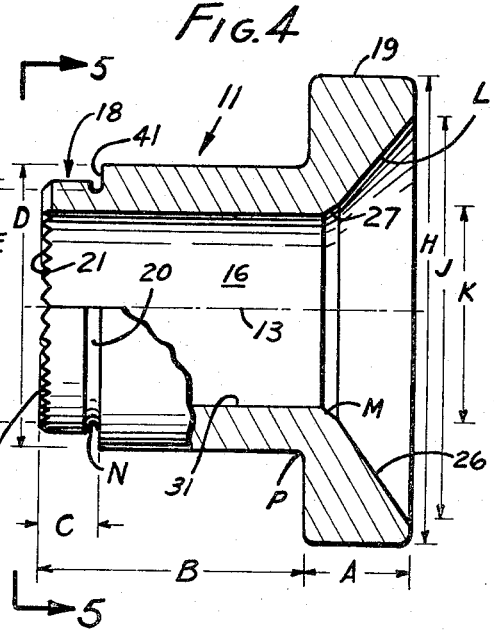
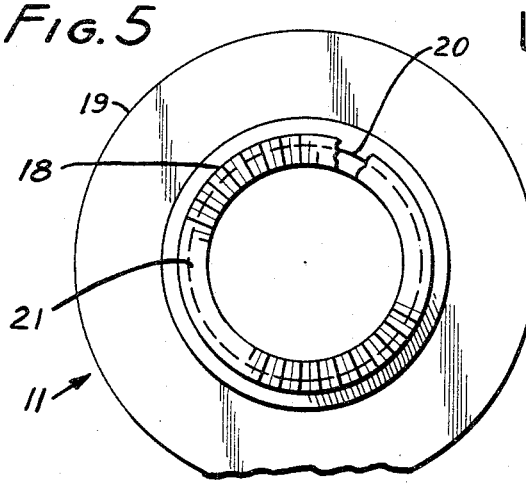
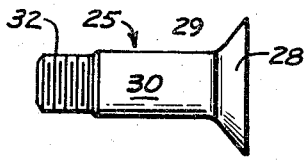
INVENTORS:
VENE L. DARBY
EDWIN E. HATTER
BY
ATTORNEYS.

United States Patent Office 3,369,442
Patented Feb. 20, 1968

3,369,442
BLIND NUT ASSEMBLY JOINT
Vene L. Darby, Redondo Beach, and Edwin E. Hatter, Torrance, Calif., assignors to Hi-Shear Corporation, Torrance, Calif., a corporation of California
Continuation of application Ser. No. 431,293, Feb. 9, 1965. This application Dec. 8, 1966, Ser. No. 611,502
1 Claim. (Cl. 85—70)

ABSTRACT OF THE DISCLOSURE

This invention relates to a blind nut assembly and to the joint formed of this assembly and a workpiece. The blind bolt includes a headed sleeve with an external groove near its non-headed end. A nut is adapted to be pulled over the end of the sleeve, its end deflected into the groove, and a mid-portion expanded to form a bulge that completes the rivet structure. In a preferred embodiment, axial striations are provided on the nut in that region of the bulge which abuts the workpiece, these striations forming rotation-resisting means with the workpiece.

The resulting joint is a firmly riveted one with the two pieces of the nut firmly held together, and in the preferred embodiment with a reduced tendency of the rivet to turn in the hole when a bolt is tightened into the nut.

This is a continuation of applicants' co-pending application, Ser. No. 431,293, filed Feb. 9, 1965, entitled Blind Nut Assembly, assigned to the same assignee as the instant application, said copending application being now abandoned.

This invention relates to a blind nut assembly and to a joint produced with it.

Blind nuts are widely known in the fastener art. In general, they constitute a tubular device which can be set from a single end thereof. The device is passed through holes in a workpiece so that a portion thereof projects beyond the rear side thereof. Then a compressive force is exerted between the two ends of the blind nut so as to form a bulge at the back side of the work in opposition to a head on the blind nut at the other end. Internal threads provide attachment means so that this nut can be utilized as a nut plate, as well as for a rivet.

The problem inherent with prior art devices of this class is that when the device is made of a single piece, its material must be optimal for upsetting purposes, which sacrifices shear strength where it is needed inside the body of the workpiece. Furthermore, in the simpler blind nut constructions, a uniform-diameter internal passage is used, which results in a wall thickness that is designed for the upsetting feature on the blind end, again sacrificing shear strength in those regions which are held in bearing relationship in the workpiece. Because the device is of a single piece, even if the cross-sectional dimensions are varied somewhat so as to render the back part more readily upsettable under columnar loading, still the cross-section available inside the workpiece is limited because a mandrel or some other device must be passed through it, and therefore the shear strength is limited.

It is an object of this invention to provide a blind nut in a plurality of parts, whereby materials and dimensions can be utilized which are best suited for their respective functions. The combination is one whereby the assembly will be held in place when set not only by its own inherent structure, but may be used in combination with a core bolt which is threaded thereinto, thereby adding greater axial strength and shear resistance.

A device according to this invention includes a headed sleeve adapted to be inserted into a workpiece, said sleeve being built of a material primarily intended for resistance to shear force. The device also includes a nut attachable to the sleeve and made of a material primarily adapted for deformation to form a bulge thus to hold the device engaged to a workpiece in cooperation with a head on the sleeve.

According to a preferred but optional feature of the invention, the sleeve includes an external cylindrical wall adapted to fit in a hole in a workpiece, together with a nose that has a lesser diameter than the wall. There is further provided an external groove between the wall and the nose. The nut comprises a tubular body with a collapsible section and an engagement section. The engagement section is adapted to make a close fit with the nose of the sleeve, whereby they are at least lightly held together prior to setting of the device. The device is set by collapsing the collapsible section to form a bulge.

According to still another preferred but optional feature of the invention, axial striations are formed on the nut which stand behind the workpiece, so that when a bulge is formed, they bear against the workpiece to resist rivet rotation.

The above and other features of this invention will be fully understood from the following description and the accompanying drawings, in which:

FIG. 1 is a side elevation partly in cutaway cross-section showing the presently preferred embodiment of the invention;

FIG. 2 shows the embodiment of FIG. 1 in an intermediate configuration;

FIGS. 3 and 4 are detailed side elevations partly in cutaway cross-section showing the components of FIG. 2;

FIG. 5 is a left-hand end view of FIG. 4 taken at line 5—5 thereof; and

FIG. 6 is a plan view of a core bolt suitable for use in the assembled device of FIG. 1.

FIG. 2 shows a joint which includes a blind nut assembly 10 according to this invention comprising a sleeve 11 and a nut 12. These are held together with a light friction or interference fit so that they can be moved and inserted into a hole as a body without falling apart, but are only tentatively fixed to each other. Generally speaking, they can, by exertion of a moderate force, be separated, but this force will be greater than is ordinarily encountered in dropping or in handling the assembly.

The sleeve has an axis 13 with a head end 14 and a shank end 15. There is an axial passage 16 extending therethrough from end to end. An external cylindrical wall 17 is formed medially of the sleeve, and stands between a nose 18 and a head 19. The nose has a lesser diameter than the wall. An external groove 20 stands between the nose and the cylindrical wall 17 having a base diameter less than the external diameter of either.

There is an external serration 21 on the end surface of the nose at the head end (facing to the left in FIGS. 2 and 4). These serrations extend along radii of the end surface.

When a core bolt such as core bolt 25 (FIG. 6) is used, a countersink 26 will be formed in the head end together with a secondary countersink 27. This will accommodate the countersink head 28 of the bolt. The secondary countersink 27 clears fillet radius 29 of the core bolt.

The bolt includes an external cylindrical wall 30 which makes a good fit with the internal wall 31 of passage 16 and there are threads 32 on the end of the bolt to engage nut 12 in a manner yet to be described.

Nut 12 is comprised of a tubular body 35 which has an axis 36. Axes 13 and 36 are coincident when the device is assembled. The nut includes a collapsible section 37 and an engagement section 38, these being contiguous to each other. An axial hole 39 extends through the tubular body.

On the exterior of the collapsible section there is formed a lip 40 whose radial dimensions are less than those of a shoulder 41 formed at the right-hand edge of groove 20 in FIG. 4. A chamfer 42 is formed at the edge of the lip. Within the axial hole 39, there is formed a bore 43, a counterbore 44 and a thread 45. At the junction of the bore and counterbore there is formed a shoulder 46. On the outside surface of the nut adjacent to the lip there is formed an external axial serration 47.

A suggested set of dimensions for a bolt of this type useful in a conventional ⅜" hole are as follows:

SLEEVE 11

| | | | |
|---|---|---|---|
| A | .100±.005 | H | .480. |
| B | .830 | J | .405—.395. |
| C | .092 | K | .270—.265. |
| D | .390—.387 | L | 100°. |
| E | .320—.318 | M | 50°. |
| F | .300—.294 | N | .016 radius. |
| G | .252—.250 | P | .030—.020 radius. |
| | | R | 20 TPI straight knurl. |

NUT 12

| | | | |
|---|---|---|---|
| S | .380 +.005 / -.002 | AA | .510. |
| T | .326 +.005 / -.002 | BB | .260. |
| U | .342±.003 | CC | .250. |
| V | .316±.002 | DD | .220. |
| W | .257 +.004 / -.001 | EE | 80 TPI straight knurl. |
| | | FF | Chamfer .030 x 45°. |
| X | .020±.005 | GG | ¼-28 UNF-3B Thread. |
| Y | Chamfer .012±.005 x 45° | | |
| Z | .125 | | |

Because it is desired that the sleeve withstand maximum shear loads, it is preferably made of a material primarily adapted for that purpose, such as 4140 alloy steel.

Because the nut must yield conveniently under columnar compression, it is preferably made of a material which will accomplish this function, for example, 304 stainless steel treated to condition "A" QQ-S-763.

The core bolt may be made of 4140 alloy steel in order to strongly reinforce the sleeve within which it fits.

As can be seen from the aforesaid table of dimensions, the internal diameter of the axial hole adjacent to the lip, that is, of bore 43, forms a close, even an interference fit, with external surface of the nose 18. Then by pressing these two elements together, the sleeve and nut can be preliminarily assembled as shown in FIG. 2. Then this assembly can be inserted in a hole 48 in a workpiece 49. This workpiece may be a single plate as shown, or even an assembly or stack of plates, to be held in shear relationship by the sleeve. Alternatively, the workpiece might simply be a plate, wherein the device furnishes threads. While the sleeve is shown with a fillister head carrying a countersink, it could as well carry a typical countersink head instead, which would fit in a countersink formed in the workpiece.

In order to set the device to the configuration of FIG. 1 a mandrel is threaded into thread 45 and then the assembly of FIG. 2 is placed into compression between these threads and the head by pulling on the mandrel and pushing on the head. The nose and bore 43 first move telescopically toward each other until the lip strikes shoulder 41. This lip is soon turned inwardly, partly because of the external chamfer on it which strikes the shoulder, and also because as the internal surface of the wall defining bore 43 drags along the nose, there is a tendency for the tubular structure of the lip to curl inwardly which causes it to be drawn toward the bottom of the groove, there to form a lock. Next, the remainder of the collapsible section closest to the lip foms a bulge 50, and the external knurls (striations) bear firmly against the workpiece, making a frictional engagement with the workpiece, and tending to resist the tendency of the nut to turn relative to the workpiece when torque is exerted on the structure. Next, the nose bears against shoulder 46 so that these serrations actually bite into this shoulder further to hold the nut against rotation relative to the sleeve. It will thereby be seen that these two sets of serrations serve to hold the nut and sleeve against relative rotation, and also to hold their assembly against rotation relative to the workpiece.

The device as shown in FIG. 1 may be used as a nut plate by means such as threading a core bolt or other threaded article to thread 45. This can serve to mount other articles to the workpiece, and also to hold the blind nut assembly compressed in its set condition. When used as a nut-and-bolt, the assembly is reinforced in shear by the core bolt when one is used. However, the core bolt is optional.

In the illustrated embodiment, an axial compressive pull of about 700 pounds is required to set the nut and sleeve. Such a substantial force indicates that the device will in fact be quite reliable. However, it will be even more reliable when a core bolt such as that shown in FIG. 6 is threaded into the threads and brought down tightly, because this serves to maintain a continuing compressive load on the fastener.

This invention is not to be limited by the embodiment shown in the drawings and described in the description which is given by way of example and not of limitation, but only in accordance with the scope of the appended claims.

We claim:

1. A structural joint comprising: a workpiece having a hole therethrough which hole has a front and a rear end; a sleeve having an axis, a head end, a shank end, and an axial passage therethrough, a shank and a head integrally forming said sleeve, said shank bearing an external cylindrical wall fitting in the hole through the workpiece with the head against the front end of the hole, and extending in full peripheral contact for the full length of the hole, a nose having a lesser diameter than said wall, and an external groove between the wall and the nose which is disposed outside the hole and adjacent to the rear end of the hole in the workpiece, a serration on the end of the nose facing away from the head end; and a nut comprising in its inset condition a tubular body with an axis, which body has a collapsible section and an engagement section, the collapsible section being disposed to stand beyond the rear end of the hole in the workpiece, there being an axial hole through the nut defined by a bore, a counterbore, and an internally threaded portion which are of progressively smaller diameters, the diameters of said nose and said bore being so proportioned that the nose is forced into the said bore in said collapsible section so that the sleeve and nut are retained to each other, and hold the nut against rotation relative to the sleeve the internal thread in the hole in said engagement section, and a lip on said nut at the end closer to the collapsible section, an external serration on the outside of the nut adjacent to the lip and standing entirely outside the hole, whereby after a compressive force is exerted to form the joint, the engagement section and the head has drawn the lip toward and into the groove, and callapsed the collapsible section to form a bulge against the workpiece the collapsible section having formed a bulge with the serration on the nut bearing firmly against the workpiece so as to restrain rotation of the nut relative to the workpiece, and the serrations on the end of the nose of the sleeve engaging a shoulder defined between the bore and the counterbore so as to provide a positive means for preventing relative rotation between the nut and the sleeve in the collapsed condition.

References Cited
UNITED STATES PATENTS

| | | | |
|---|---|---|---|
| 2,763,314 | 9/1956 | Gill | 85—70 |
| 2,887,003 | 5/1959 | Brilmyer | 85—73 |
| 2,914,106 | 11/1959 | Boyd | 85—70 |
| 3,063,329 | 11/1962 | Vaughn | 85—73 |
| 3,236,143 | 2/1966 | Wing | 85—70 |
| 3,257,889 | 6/1966 | Fischer | 85—70 |

MARION PARSON, Jr., *Primary Examiner.*